No. 693,822. Patented Feb. 18, 1902.
M. A. CRANE.
AMBULANCE COACH.
(Application filed Dec. 7, 1901.)

(No Model.) 3 Sheets—Sheet 3.

WITNESSES:
Gustave Dieterich
John Kehlenbeck

INVENTOR
Mary A. Crane
BY
Augustus Dieterich
her ATTORNEY

UNITED STATES PATENT OFFICE.

MARY A. CRANE, OF NEW YORK, N. Y.

AMBULANCE-COACH.

SPECIFICATION forming part of Letters Patent No. 693,822, dated February 18, 1902.

Application filed December 7, 1901. Serial No. 85,006. (No model.)

*To all whom it may concern:*

Be it known that I, MARY A. CRANE, a citizen of the United States, residing at the city of New York, borough of Manhattan, in the county and State of New York, have invented certain new and useful Improvements in Ambulance-Coaches, of which the following is a full, clear, and exact specification.

My invention relates to improvements in vehicles for conveying and transporting invalids; and said invention has for its object more particularly to provide a vehicle for the purpose above named which shall present the appearance outwardly of an ordinary vehicle and when not in use for the purpose of transporting invalids may be readily converted into an ordinary passenger-vehicle disclosing none of its ambulance features. These objects above set forth I am enabled to attain by means of my invention which consists in novel details of construction, and in the combination, connection, and arrangement of parts hereinafter more fully set forth and then pointed out in the claims.

Figure 1:
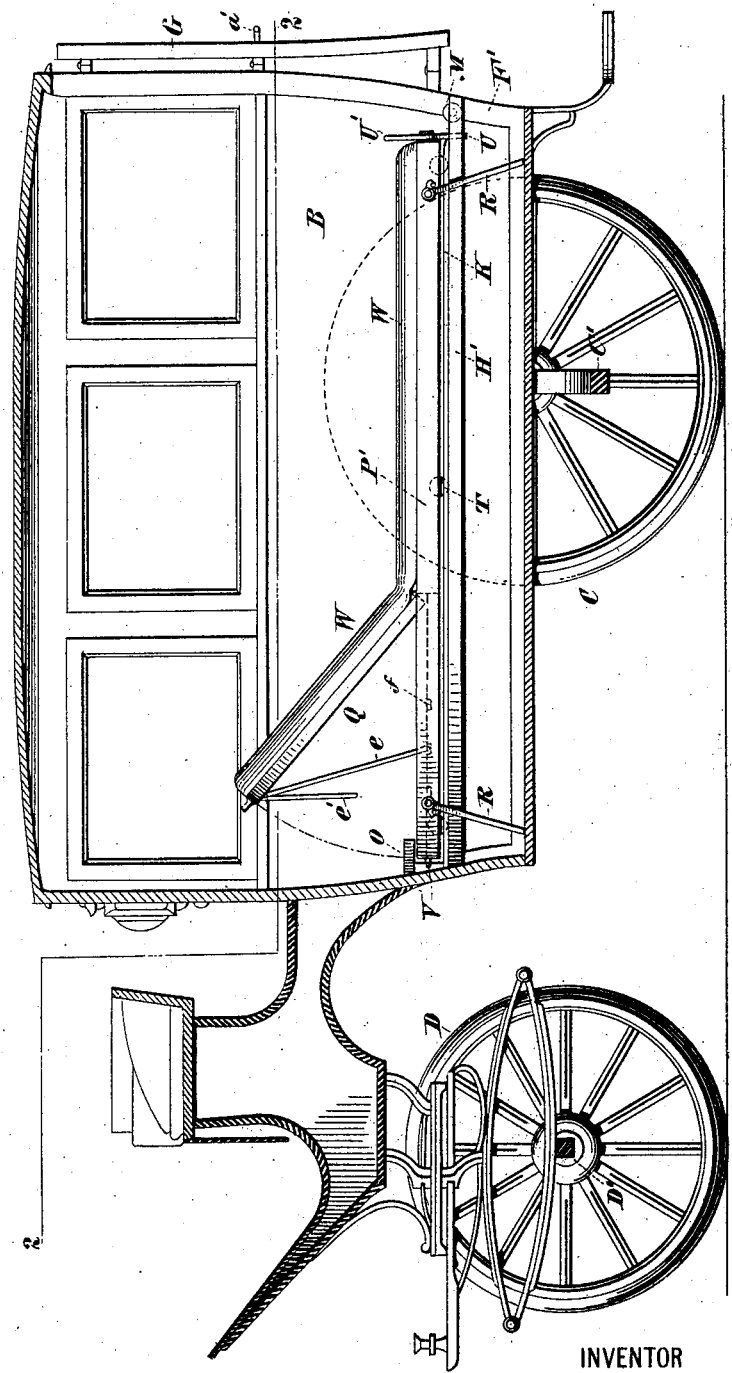
Figure 2:
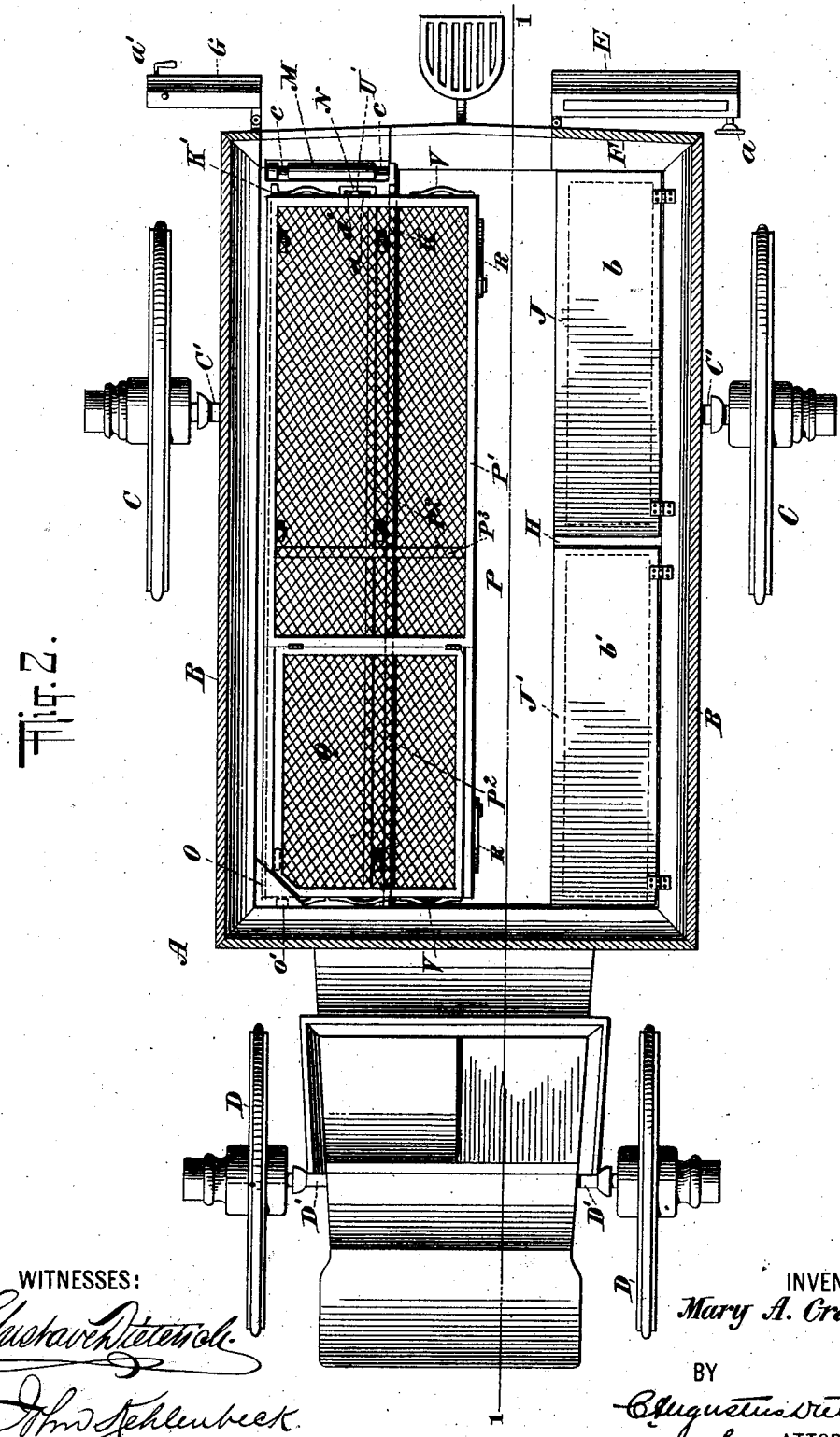
Figure 3:
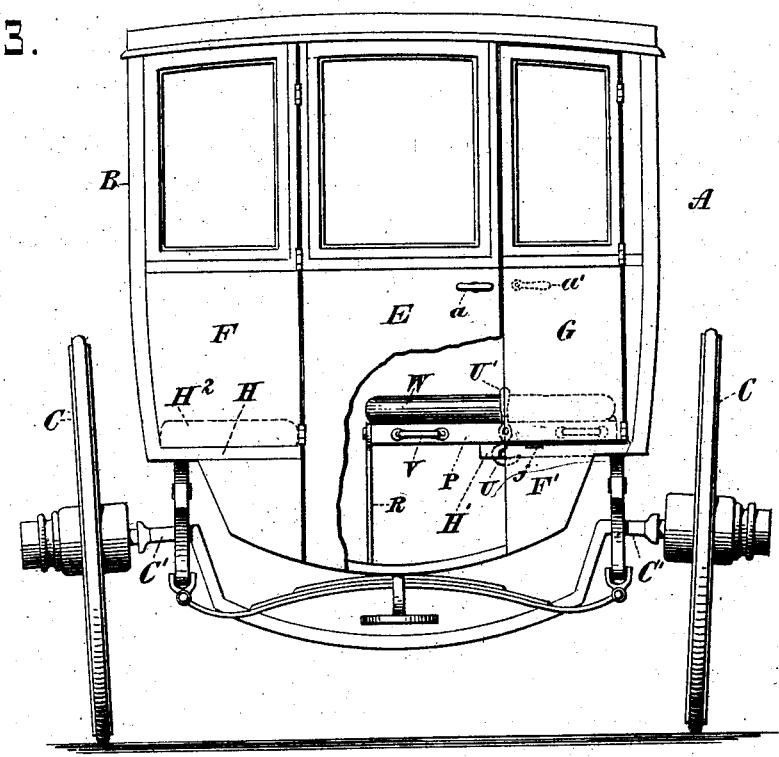
Figure 4:
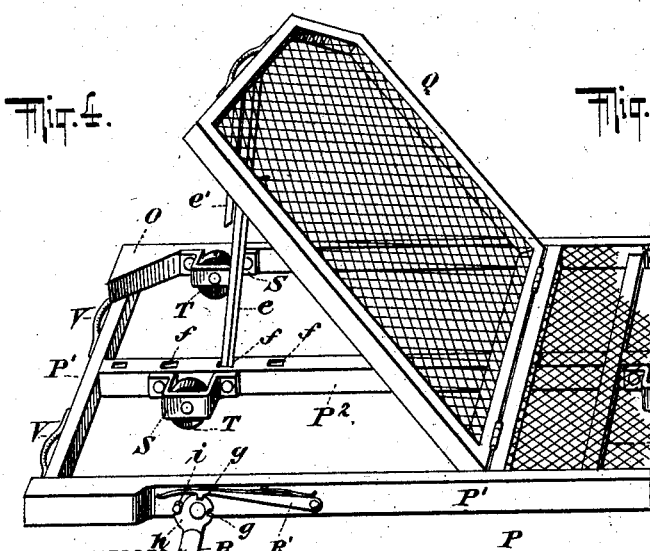
Figure 5:
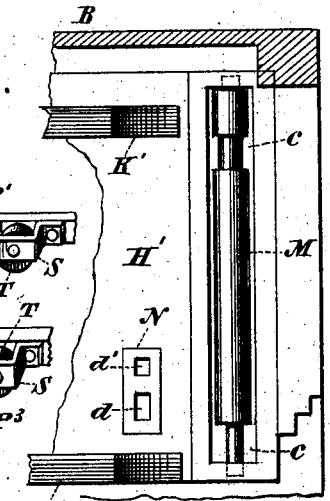

In the accompanying drawings, forming part of this specification, wherein like letters of reference indicate like parts, Figure 1 is a vertical section on the line 1 1 of Fig. 2, illustrating an ambulance-coach constructed according to and embodying my invention. Fig. 2 is a horizontal section on the line 2 2 of Fig. 1, showing the cot in position within the vehicle. Fig. 3 is an end view thereof, partly broken away to show interior of the vehicle. Fig. 4 is an enlarged detail perspective view of the upper portion of the cot, and Fig. 5 is an enlarged detail plan of the lower end of the support for the cot.

In said drawings, A designates the vehicle as a whole, which is of the construction ordinarily known as a "wagonette" or "opera bus."

B denotes the body of the vehicle, which is mounted in the usual manner upon the wheels C C D D by means of the axles C' D' and intermediate supporting means.

The rear end of the vehicle-body B is provided with the customary door E, which is hinged at its left-hand edge to the rigid end section F of the vehicle, and the upper portion G of the corresponding end section F' is hinged at its right-hand edge to the side of the body B, and the door E and hinged end portion G are respectively provided with locking devices $a$ $a'$.

Within the body B are provided two seats H H', which face each other and extend the entire length of said body B and are covered with suitable cushions $H^2$ when the vehicle is not used for ambulance purposes. The seat H is provided with two longitudinal receptacles J J', each being about one-half the length of the seat and provided, respectively, with hinged lids or tops $b$ $b'$. The receptacle J is further provided with a metallic lining and adapted to contain ice, and the receptacle J' is arranged to receive an oxygen-cylinder, surgical and medical supplies, &c. The seat H' is entirely open at its front and forms a receptacle for a litter and other articles, and upon the upper surface of said seat H', adjacent to its front edge, is secured a longitudinal guide K, and adjacent to the rear edge of said seat is provided a similar guide K', arranged parallel to the guide K. At the outer or rear end of said seat H' is a slot L, within which is mounted a roller M, having the cut-away portions $c$ $c$ therein to permit of the passage of the rollers T T on the cot P, and directly to the rear of said roller M, adjacent to the front edge of the seat, is a plate N, having a large recess $d$ and a smaller recess $d'$ therein.

In the inner corner of the body B, at its forward end, slightly above the seat H', is secured a triangular block or retaining-piece O, beneath which is arranged a stop O'.

P denotes a cot adapted for insertion within the vehicle-body B and securement therein upon the seat H', said cot comprising a rectangular frame P', having a longitudinal brace $P^2$ and a transverse brace $P^3$ and covered with ratan. The cot P is further provided with a hinged headpiece Q, having long and short braces $e$ $e'$, hinged to the under side thereof, the free ends of which are adapted to rest in the recesses $f$ in the upper surface of the longitudinal brace $P^2$, whereby said headpiece Q may be adjusted to eight different inclinations. At the side of the frame P', adjacent to its head and foot, are pivoted legs R R, having circular upper ends provided with notches $g$ $g$, adapted to receive the ends of the spring-pressed detents R', whereby said legs R R are held to their extended and folded positions, and h h denote projecting toes arranged on the circular heads of said legs R R, adapted to contact with studs i i in the sides of the frame, whereby to limit the movement of said legs R R. Upon the inner surface of one of the sides of the frame P' and one of the sides of the longitudinal brace P², adjacent to the head and foot and the middle of the cot P, are secured brackets S S, within which are mounted rollers T T, which are adapted to roll upon the surface of the seat H', between and in contact with the opposing faces of the guides K K, whereby to guide said cot P while being inserted in the vehicle and to hold the same against lateral movement upon the seat H' after it has been adjusted in position thereon. At the center of the foot of the cot P is pivoted a hook U, having a handle portion U' and a support j for said handle, said hook U being adapted to engage the portion of the plate N between the recesses d d, whereby to lock said cot in position upon the seat H' when the corner k of its head is firmly in position beneath the triangular piece O.

V V denote handles secured to the head and foot of the cot P to facilitate the handling thereof, and W denotes an air-mattress disposed upon the cot P.

Without limiting myself to the details of construction, which may be varied within the scope of the invention, what I claim, and desire to secure by Letters Patent of the United States, is—

1. The combination with a vehicle, of a support therein, a cot adapted to be supported thereon longitudinally for its entire length, and transversely for a portion of its width, and retaining means whereby to secure said cot against transverse and longitudinal movement upon said support, substantially as specified.

2. The combination with a vehicle of a longitudinal support therein, of a cot adapted to rest upon said support, retaining means arranged upon said support, means carried by said cot adapted to coöperate with the means arranged upon said support whereby to secure said cot against transverse movement thereon, means arranged within said vehicle adapted to retain one end of said cot, and a locking device provided at the other end of said cot adapted to engage said support whereby to secure said cot against longitudinal movement thereon, substantially as specified.

3. The combination with a vehicle, of a longitudinal support therein, a retaining device provided in one end thereof above said support, an engageable device arranged in said support near its other end, parallel guides arranged upon the surface of said support, a cot having rollers upon its under side adapted to roll upon said support between said parallel guides, and a locking device carried by said cot at its lower end adapted to engage the device in the support whereby to secure said cot in position upon said support, substantially as specified.

4. The combination with a vehicle having a door E and hinged end section G, of a longitudinal support therein, parallel guides upon the upper surface of said support, a retaining device arranged in said vehicle-body adjacent to the upper end of said support, a device and a roller arranged in the lower end of said support, a cot having rollers arranged upon its under side adapted to work upon the surface of said support between said parallel guides, and a hook member provided at the lower edge or foot of said cot adapted to coöperate and engage with the device in the lower end of said support whereby to secure said cot in position thereon, substantially as specified.

5. The combination with a vehicle having a door E and hinged end section G adjacent thereto, of a longitudinal support therein, parallel guides upon the upper surface of said support, a retaining device arranged in one corner of said vehicle-body adjacent to the upper end of said support, a device and a roller arranged at the lower end of said support, a cot having folding legs at its sides adjacent to its head and foot, rollers arranged upon its under side adapted to work upon said support intermediate the guides thereon, and a hook member provided at the lower edge of said cot, all coöperating to secure and maintain said cot in position upon said support, substantially as specified.

Signed at the city of New York, in the county and State of New York, this 6th day of December, 1901.

MARY A. CRANE.

Witnesses:
WM. C. CRANE,
AMOS BISHOP.